United States Patent [19]

Sasaki

[11] Patent Number: 5,329,422
[45] Date of Patent: Jul. 12, 1994

[54] PORTABLE ELECTRONIC APPARATUS HAVING OPTIONAL COMPONENTS IN A SHIELDED RECESS FOR FUNCTION EXPANSION

[75] Inventor: Katumaru Sasaki, Tokyo, Japan

[73] Assignee: Kabushiki Kaisha Toshiba, Kawasaki, Japan

[21] Appl. No.: 53,805

[22] Filed: Apr. 29, 1993

Related U.S. Application Data

[63] Continuation of Ser. No. 783,971, Oct. 29, 1991, abandoned.

[30] Foreign Application Priority Data

Nov. 30, 1990 [JP] Japan ................... 2-340285

[51] Int. Cl.⁵ ................ H05K 9/00; H05K 7/06; G06F 1/16
[52] U.S. Cl. ................ 361/686; 361/683; 361/818; 174/35 GC
[58] Field of Search ........ 361/380, 390–395, 361/399, 424, 679–687, 724–727, 816–818; 174/35 R, 35 GC; 364/708, 708.1

[56] References Cited

U.S. PATENT DOCUMENTS

| | | | |
|---|---|---|---|
| 4,567,317 | 1/1986 | Ehrlich et al. | 174/35 R |
| 4,926,291 | 5/1990 | Sarraf | 361/424 X |
| 5,045,971 | 9/1991 | Ono et al. | 361/424 X |
| 5,058,045 | 10/1991 | Ma | 364/708 |

OTHER PUBLICATIONS

Toshiba Reference Manual "T3200SX" Computer, pp. 5/12 to 5/15, Jul. 1989.

*Primary Examiner*—Leo P. Picard
*Assistant Examiner*—Michael W. Phillips
*Attorney, Agent, or Firm*—Cushman, Darby & Cushman

[57] ABSTRACT

A portable computer includes a base unit equipped with a display unit and a keyboard. The base unit has an optional component holding recess covered with an conductive layer for electro-magnetic shielding. An optional component unit is mounted in the holding recess and electrically connected to the base unit. The optional component unit is divided into a printed circuit board having a conductive circuit pattern and a board support for supporting the printed circuit board. The board support is made of an electrically insulating material, such as a synthetic resin material. The opening of the holding recess is closed by a conductive cover. In that closed state, the cover is placed in contact with the conductive layer and, together with the conductive layer, surrounds the optional component unit to achieve an electromagnetic shield.

19 Claims, 11 Drawing Sheets

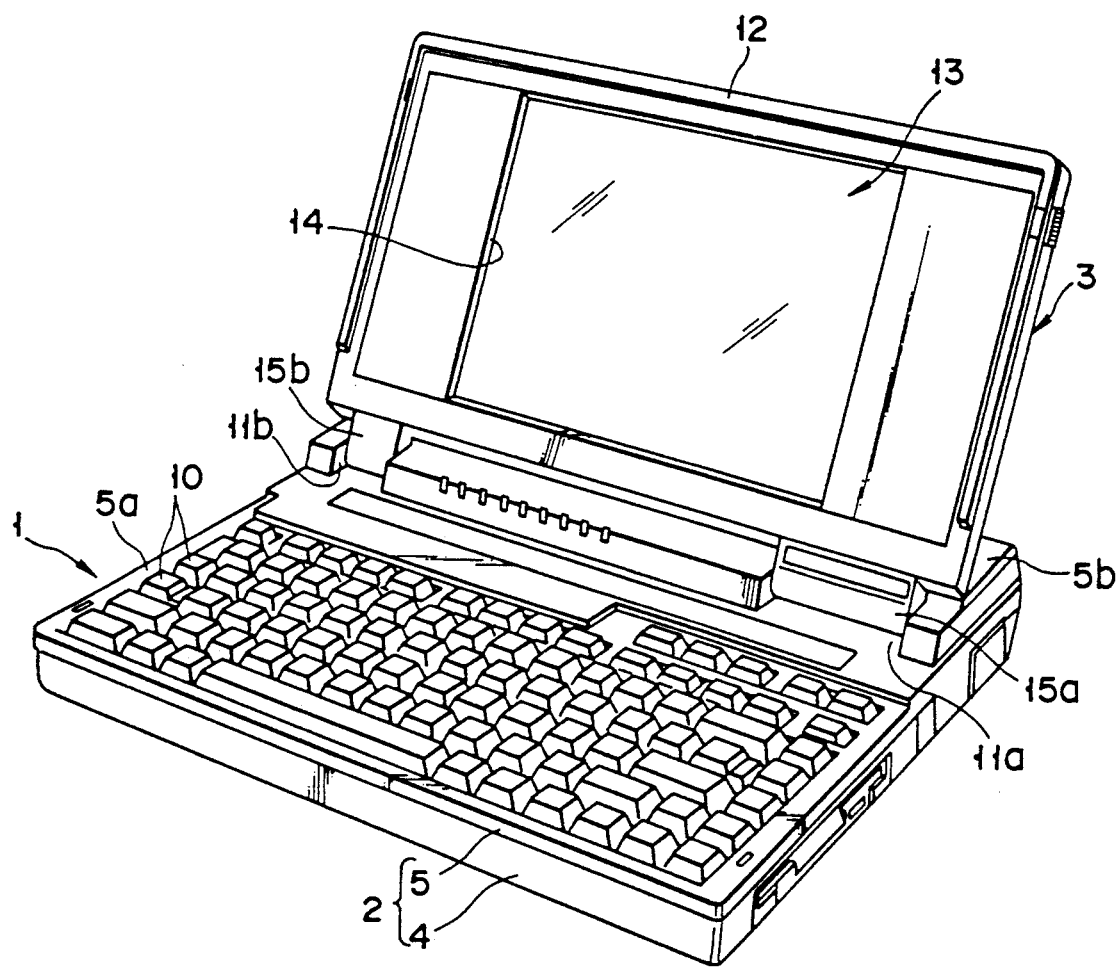
F I G. 1

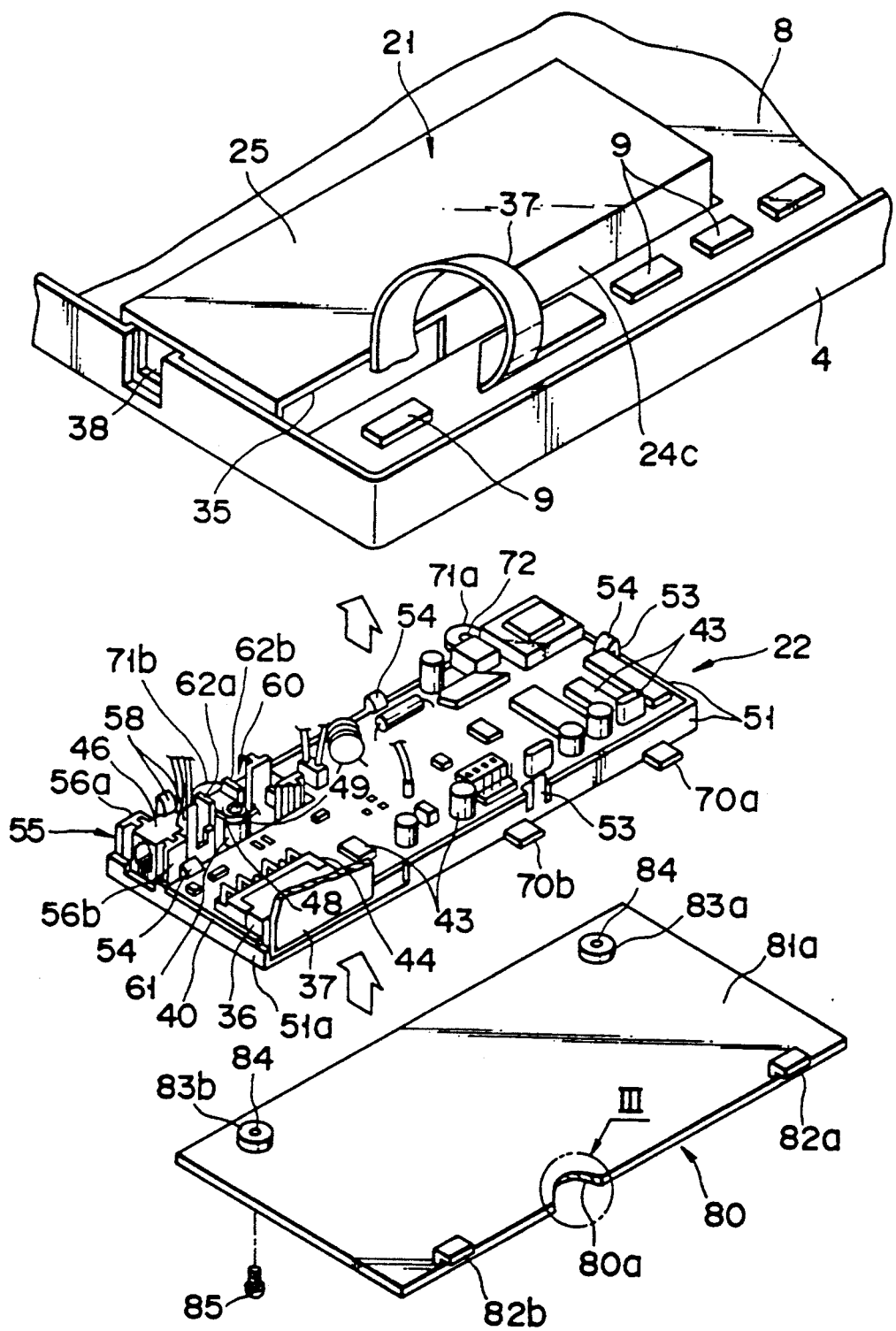
F I G. 2

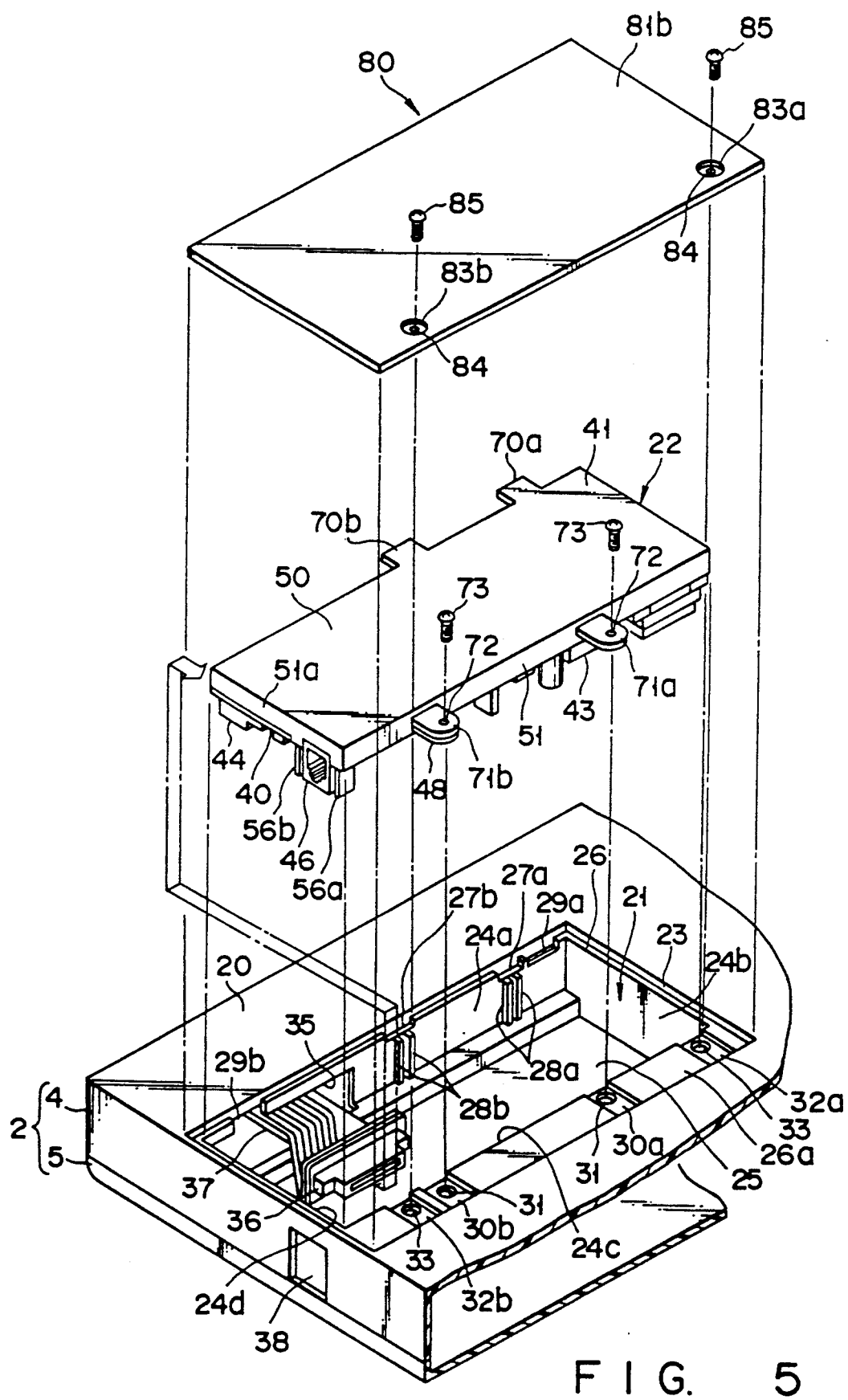
F I G. 5

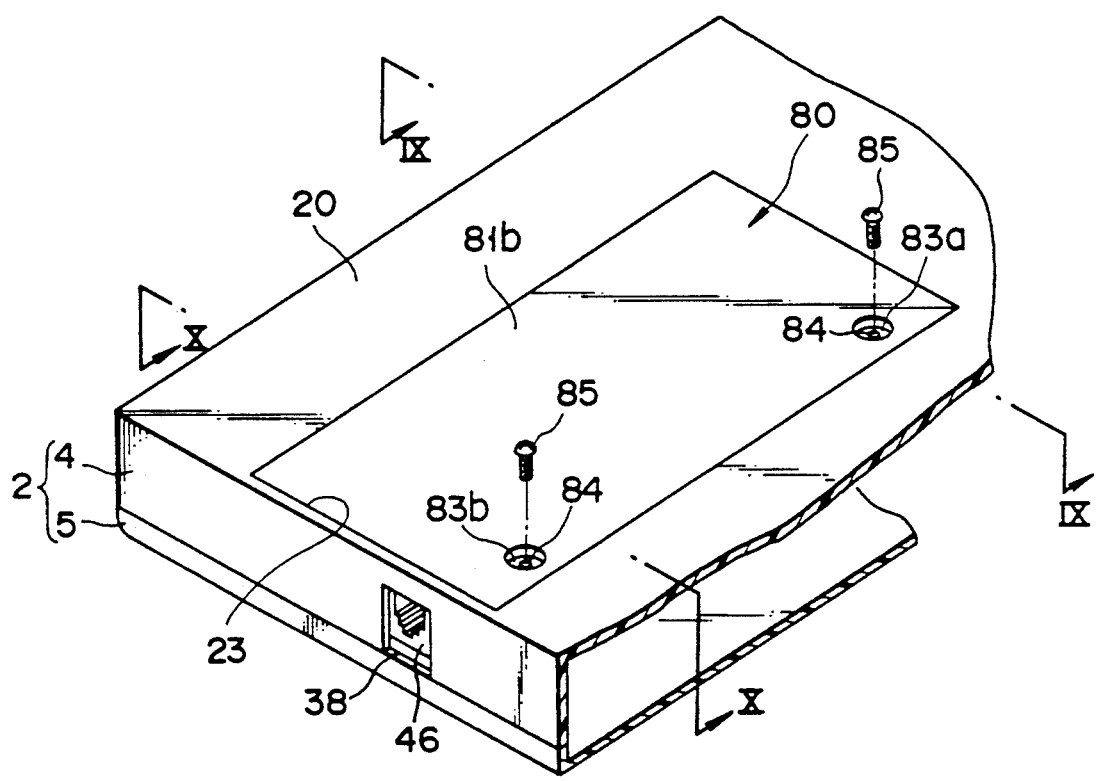
F I G. 8

PORTABLE ELECTRONIC APPARATUS HAVING OPTIONAL COMPONENTS IN A SHIELDED RECESS FOR FUNCTION EXPANSION

This is a continuation-in-part of application Ser. No. 07/783,971, filed on Oct. 29, 1991, which was abandoned upon the filing hereof PORTABLE ELECTRONIC APPARATUS HAVING OPTIONAL COMPONENTS FOR FUNCTION EXPANSION.

BACKGROUND OF THE INVENTION

1. Field of the Invention

The present invention relates to a portable electronic apparatus, such as a computer or a word processor and, in particular, a structure for incorporating an optional component unit, such as a MODEM for use in a telephone line, into a base unit of the apparatus.

2. Description of the Related Art

Recently, various book- and laptop-type portable computers have been proposed which incorporate a keyboard and a flat panel-type display unit into a flat box-like base unit.

These apparatuses enable an optional component unit, such as a MODEM connected to a telephone line, to be added, if required. In the conventional portable computer, a storage space for incorporating an optional component unit as an expanded unit therein is initially secured in the base unit. The storage space has an opening provided in the peripheral surface of the base unit and walls defining the opening and inside of the base unit. The optional component unit in the storage space has a case for closing the opening. The case constitutes a portion of the peripheral surface of the base unit in a continuous relation. A printed circuit board is supported in the case and has a circuit pattern printed as a printed pattern and various circuit parts electrically connected to the circuit pattern. When the opening of the storage space is closed by the case, the printed circuit board and circuit parts are held in a space defined by the case and defined walls of the storage space.

Some of the optional components produce high frequency noise during operation, sometimes causing radio interference and communication disturbance. In order to achieve an electromagnetic shield to reduce radio interference and communication disturbance in the conventional portable computer, the case and defined walls which surround the optional component unit are covered with a conductive layer, such as a plating layer.

Recently a printed circuit board constituting the optional component unit has been fabricated by other manufactures, such as the third party. However, the fabricated printed circuit board is not stable in its quality and sometimes the circuit pattern deviates out of standards. If the printed circuit board having an out-of-standard circuit pattern is supported in the case, the circuit pattern and conductive layer may be short-circuited at an area of contact of the printed circuit board with the case due to the conductive covering of the case. That is, since the conductive layer covers projections and hooks on the case so as to support the printed circuit board thereon, it is substantially impossible to completely cover the conductive sheet, and so on, with a nonconductive layer. Since the conductive layer may naturally be exposed at an area supporting the printed circuit board, the optional component unit may fail to operate, or may be damaged, due to short-circuiting between the conductive layer and the circuit pattern.

SUMMARY OF THE INVENTION

It is accordingly the object of the present invention to provide a portable electronic apparatus which can prevent short-circuiting between a circuit pattern and a conductive layer, even if the pattern shape of a circuit pattern on a printed circuit board is somewhat out of standard dimensions, while also positively shielding the electromagnetic noise produced from the optional component unit.

The portable electronic apparatus of the present invention includes a flat box-like base unit having a peripheral surface, the base unit includes an opening provided in the peripheral surface and a holding recess having walls defining the opening the interior of the base unit and the defined walls of the holding recess are covered with a conductive layer to provide an electromagnetic shield. The holding recess holds an optional component unit for function expansion which is electrically connected to the base unit. The optional component unit is divided into a printed circuit board having a conductive circuit pattern and circuit parts electrically connected to the circuit pattern and a board support for supporting the printed circuit board. The board support is made of an electrically insulating material. The base unit has a conductive cover by which the opening of the holding recess is closed to conceal the optional component unit. In the closed state, the cover is electrically connected to the conductive layer and, together with the conductive layer, surrounds the optional component unit to achieve an electromagnetic shield.

In the arrangement of the present apparatus, the board support for supporting the printed circuit board is made of an electrically insulating material. Even if the pattern shape of the circuit pattern on the printed circuit board is out of standard such that a portion of the circuit pattern contacts the board support, no short-circuiting occurs at an area between the board support and the circuit pattern.

The cover for closing the opening of the holding recess is conductive in nature and, upon being attached to the base unit becomes electrically connected to the conductive layer of the holding recess. In this connected state, the optional component unit is surrounded with the conductive layer and cover, thus shielding electromagnetic noise produced from the optional component unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a perspective view showing a book-type portable computer according to an embodiment of the present invention;

FIG. 2 is an exploded, perspective view showing an optional component unit and a cover to be attached to a holding recess of a base unit;

FIG. 5 is an exploded, perspective view showing the optional component unit and the cover to be attached to the base unit;

FIG. 8 is a perspective view showing the holding recess of the base unit covered by the cover;

DETAILED DESCRIPTION OF THE PREFERRED EMBODIMENTS

Figure 11:
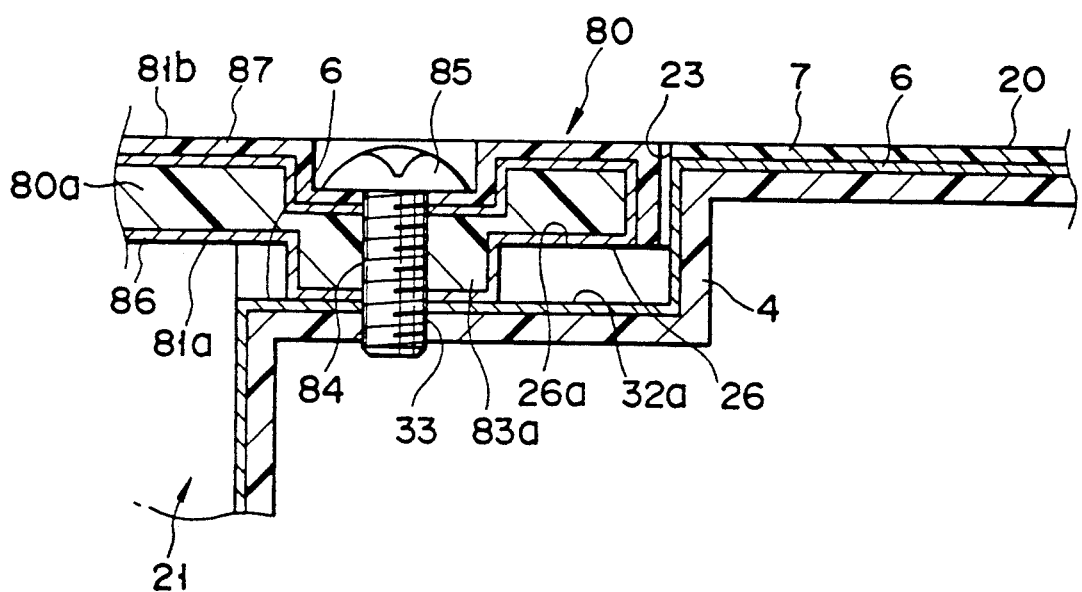
FIG. 11 is an enlarged, cross-sectional view showing an area XI in FIG. 9.

FIG. 1 shows a book type portable computer 1. The portable computer 1 includes a flat box-like base unit 2 and a flat panel type display unit 3. The base unit 2 comprises a bottom case 4 serving as bottom plate and a top cover 5 covering the bottom case 4. The bottom case 4 and the top cover 5 are made of a synthetic resin material. As shown in FIG. 11, an outer exposure surface of the bottom case 4 is covered with a conductive plating layer 6 and the surface of the plating layer 6 is covered with a nonconductive decorative layer 7.

As shown in FIG. 2, a printed circuit board 8 is held in the bottom case 4 and many circuit parts 9 are mounted on the printed circuit board 8.

The top cover 5 has a front portion 5a and a rear portion 5b. A keyboard 10 is mounted on the front portion 5a of the top cover 5 and electrically connected to the printed circuit board 8. The rear portion 5b of the top cover 5 is upwardly raised from the keyboard 10 and has a pair of leg mounting recesses 11a, 11b.

The display unit 3 includes a housing 12 and a flat liquid crystal display device 13 held in the housing 12. The liquid crystal display device 13 is externally exposed through an opening 14 of the housing 12. The housing 12 of the display unit 3 includes a pair of leg portions 15a, 15b. The leg portions 15a and 15b are fitted into the leg mounting recesses 11a and 11b such that they are rotatable through associated hinge mechanism (not shown). By this hinge connection, the display unit 3 is rotatable between a closed position where the keyboard 10 is covered and an open position where the keyboard 10 is exposed so that the keyboard 10 can be operated.

As shown in FIG. 5, the bottom case 4 of the base unit 2 has a flat bottom surface 20 where an optional component holding recess 21 is formed. MODEM (modulator/demodulator) 22 is incorporated into the holding recess 21 and used as an optional component unit for function expansion in the computer 1. The holding recess 21 has a rectangular opening 23 provided in a bottom surface 20 as well as side walls 24a, 24b, 24c, 24d and bottom wall 25 defining the opening 23 and inside of the base unit 2. The side walls 24a, 24b, 24c, 24d and bottom wall 25 are covered with a plating layer 6 shown in FIG. 11. The plating layer 6 is exposed in the holding recess 21 without being covered with the decorative layer 7. An engaging area 26 is provided along the whole edge of the opening 23 such that it extends in an inward direction. The engaging area 26 has an engaging surface 26a parallel to the bottom wall 25 of the holding recess 21. The engaging surface 26a is continuous with the side walls 24a, 24b, 24c and 24d in the inner side of the holding recess 21 and the bottom surface 20 of the base unit 2. A pair of mating recesses 27a, 27b are provided in the engaging area 26 continuous with the side wall 24a. A pair of receiving portions 28a, 28b are provided on the side wall 24a at those portions corresponding to the pair of mating recesses 27a, 27b and extend in a depth direction of the holding recess 21. The extreme ends of the receiving areas 28a and 28b are continuous with the bottoms of the mating recesses 27a and 27b. A pair of engaging holes 29a, 29b are provided in the engaging area 26 continuous with the side wall 24a and situated on the outer sides of the mating recesses 27a and 27b. A pair of first fixing sections 30a, 30b are provided as a pair of recesses in the engaging area 26 continuous with the side wall 24c which faces the side wall 24a. A screw hole 31 is provided in the bottom of the respective first fixing sections 30a and 30b. Second fixing sections 32a and 32b are formed on the outside of the first fixing sections 30a and 30b and a screw hole 33 is provided in the respective fixing sections 32a and 32b. The engaging area 26, mating recesses 27a and 27b, receiving areas 28a and 28b, first fixing sections 30a and 30b and second fixing sections 32a and 32b, together with the side walls 24a to 24d, are wholly covered with the plating layer 6.

A connector outlet hole 35 is opened in the side wall 24a to enable the interior of the base unit 2 to communicate with the holding recess 21. A first connector 36 is provided in the opening of the connector outlet hole 35. The first connector 36 is electrically connected via a flexible circuit board 37 to the printed circuit board 8 in the base unit 2. A connector insertion hole 38 is provided in the side wall 24d situated adjacent the side wall 24a.

Figure 4:
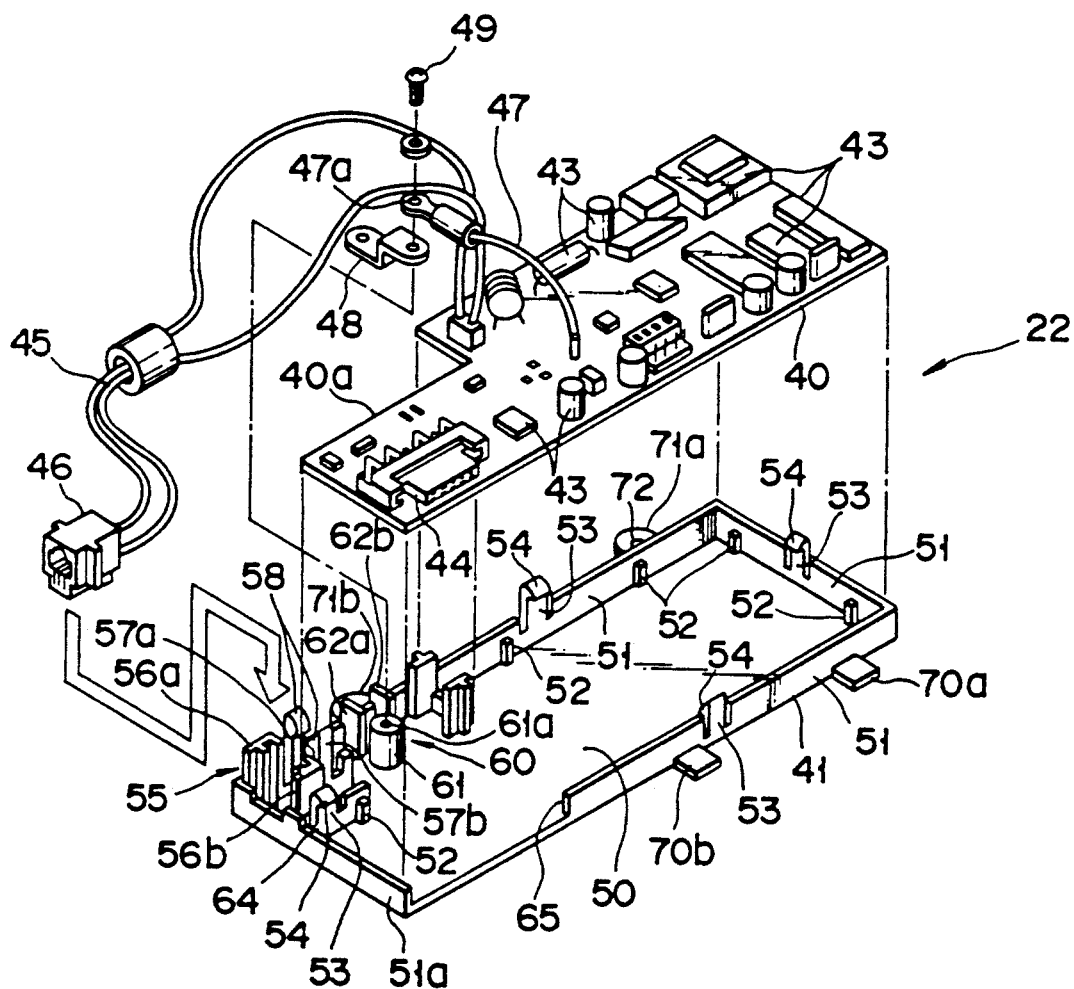
FIG. 4 is a perspective view showing an optional component unit divided into a printed circuit board and a board support.
Figure 9:
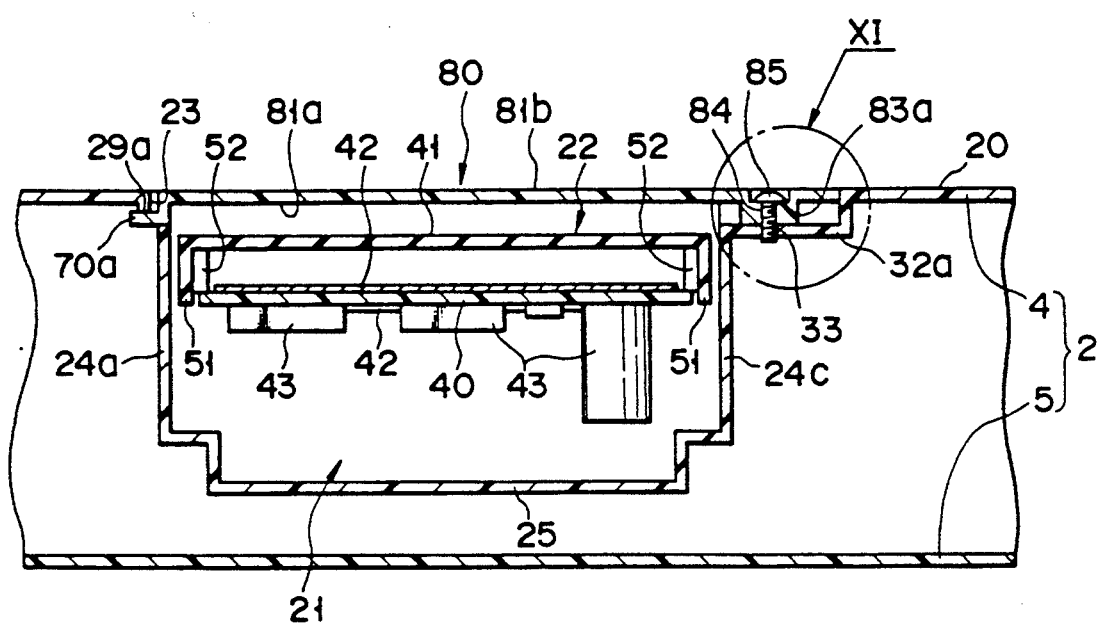
FIG. 9 is a cross-sectional view taken along line IX—IX in FIG. 8.
Figure 10:
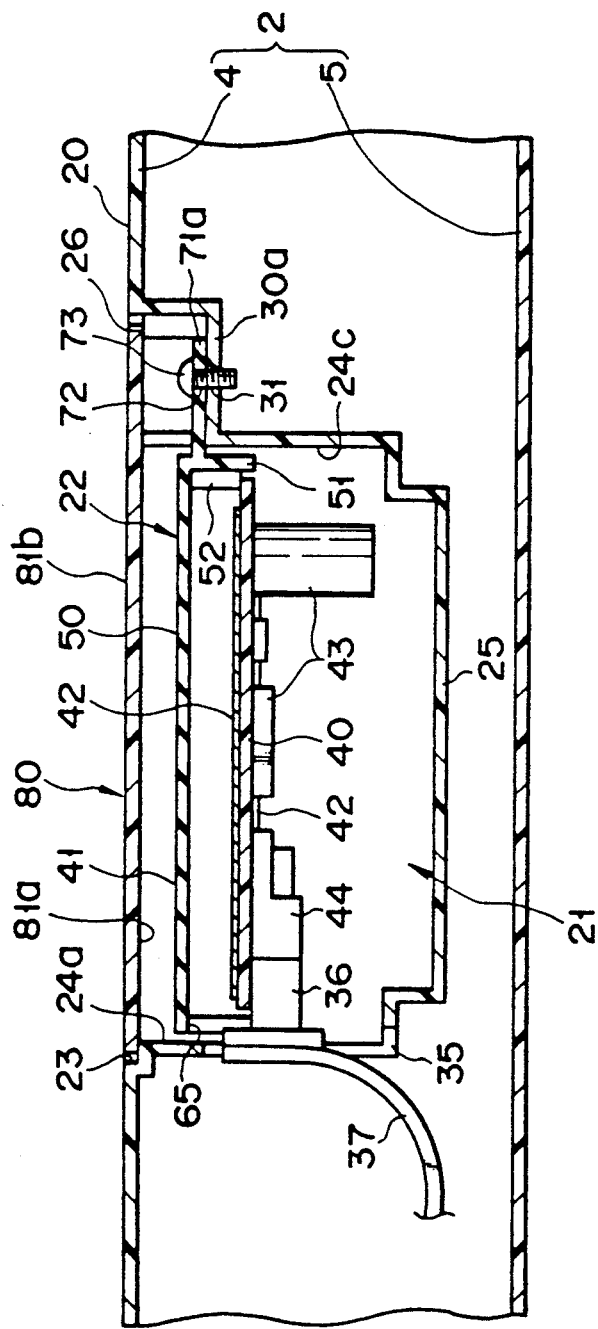
FIG. 10 is a cross-sectional view taken along line X—X in FIG. 8.

MODEM 22 is incorporated into the holding recess 21 and, as shown in FIG. 4, divided into a printed circuit board 40 and a board support 41 for supporting the printed circuit board 40. The printed circuit board 40 has a substantially rectangular shape with a cutout 40a provided at one corner. As shown in FIGS. 9 and 10, a predetermined circuit pattern 42 is printed on each side of the printed circuit board 40 and various kinds of circuit parts 43 and a second connector 44 are provided on one side of the printed circuit board 40. The circuit parts 43 and second connector 44 are electrically connected to the circuit pattern 42. The second connector 44 is electrically connected to the first connector 36 in the holding recess 21 to enable the base unit 2 to be connected to MODEM 22. A connector 46 for telephone line connection is connected to the circuit pattern 42 by means of a lead wire 45. A ground line 47 is connected to the circuit pattern 42 and has a terminal 47a. The terminal 47a is connected by a screw 49 to a connection terminal 48 for ground.

The board support 41 is one piece molded using an electrically insulating material, such as a synthetic resin material. The board support 41 is dimensioned so as to be fitted inside the opening 23. As shown in FIG. 4, the board support 41 is flat box-like in configuration with one side opened and a base plate 50 having a rectangular shape corresponding to that of the printed circuit board 40 and an engaging wall 51 provided as an erect wall on the marginal edge of the base plate 50. The printed circuit board 40 is surrounded with the engaging wall 51. A plurality of receiving members 52 for supporting the marginal edge of the printed circuit board 40 are formed on the inner surface of the engaging wall 51. The ends of the receiving members 52 are retracted from the extreme end of the engaging wall 51 toward the base plate 50 by an amount corresponding to the thickness of the printed circuit plate 40. Of the engaging walls 51, an engaging wall 51a situated on the second connector 44 side has its extreme end formed flush with the ends of the receiving members 52 and supports the marginal edge portion of the printed circuit board 40 at the extreme end of the engaging wall 51a. The base plate 50 has a support wall 64 at an area corresponding to the cutout 40a of the printed circuit board 40. The support wall 64 has a receiving member 52 and the marginal edge portion of the cutout 40a of the printed circuit board 40 is supported on the end of the receiving member 52.

The support wall 64 and engaging walls 51, except the engaging wall 51a, have an elastically deformable engaging projection 53. The engaging projection 53 has a hook 54, each, at the extreme end. The hooks 54 are hooked on the marginal edge portion of the printed circuit board 40 and, together with the receiving members 52 and engaging wall 51a, hold the printed circuit board 40 in place. Thus the printed circuit board 40 is held by the board support 41 at its marginal edge.

As shown in FIG. 4, the base plate 50 of the board support 41 has a connector holding section 55 in a position corresponding to the cutout 40a of the printed circuit board 40 to hold the connector 46 for telephone line connection. The connector holding section 55 has a pair of connector guides 56a, 56b and connector holding walls 57a, 57b and the connector 46 is fitted at an area defined by the connector guides 56a, 56b and connector holding walls 57a, 57b. The connector holding walls 57a, 57b have a hook 58, each, at their extreme end. As the in FIG. 2, when the connector 46 is so fitted at the aforementioned area, the hooks 58 are hooked on the outer marginal surface of the connector 46 so that the connector 46 is held at the end portion of the board support 41. In a position adjacent the connector holding walls 57a 57b the base plate 50 has a terminal holding section 60 for holding a terminal fitting 48. The terminal holding section 60 has a boss 61 for receiving one end of the connection terminal 48 and a pair of terminal guides 62a, 62b hold the connection terminal 48 therebetween, that is, guide it in its mount position. The connection terminal 48 is fastened by the screw 49 to a screw hole 61a of the boss 61.

The engaging wall 51 of the board support 41 is cut away at an area facing the second connector 44. The cutout 65 allows the first connector 36 and the flexible circuit board 37 to pass therethrough and faces the connector outlet hole 35 when the board support 41 is mounted in the holding recess 21.

As shown in FIGS. 2, 4, 5 and 6, the engaging wall 51 of the board support 41 has a pair of engaging pieces 70a, 70b detachably mounted in the mating recesses 27a, 27b of the holding recess 21 and a pair of fixing pieces 71a, 71b detachably mounted in the first fixing sections 30a, 30b of the receiving recess 21. The engaging pieces 70a, 70b are provided flush with the outer surface of the base plate 50 such that they are fitted into the mating recesses 27a, 27b without being projected from the engaging surface 26a of the engaging area 26. The fixing pieces 71a, 71b are fitted into the first fixing sections 30a, 30b without being projected from the engaging surface 26a of the engaging area 26. The fixing pieces 71a, 71b have associated through holes 72 aligned with the screws 31, as shown in FIG. 5. The connection terminal 48 is superimposed on the fixing piece 71b.

When the board support 41 is inserted into the holding recess 21 via the opening 23, the mating pieces 70a, 70b are fitted into the mating recesses 27a, 27b so that they are supported on the end faces of the receiving areas 28a, 28b. By so doing, the fixing pieces 71a, 71b are fitted in the first fixing sections 30a, 30b. As a result, the board support 41 is so positioned in the holding recess 21 such that its base plate 50 is provided parallel with the bottom wall 25 of the holding recess 21. By threadably inserting the screw 73 via the corresponding through hole 72 into the screw hole 31 in that state, the board support 41 is fixed to the holding recess 21 with the printed circuit board 40 and circuit parts 43 directed toward the bottom wall 25 of the holding recesses 21. At the same time, the connection terminal 48 is placed in contact with the plating layer 6 covered on the first fixing section 30a and is grounded. The connector 46 is positioned at a connector insertion hole 38 of the base unit 2.

Figure 7:
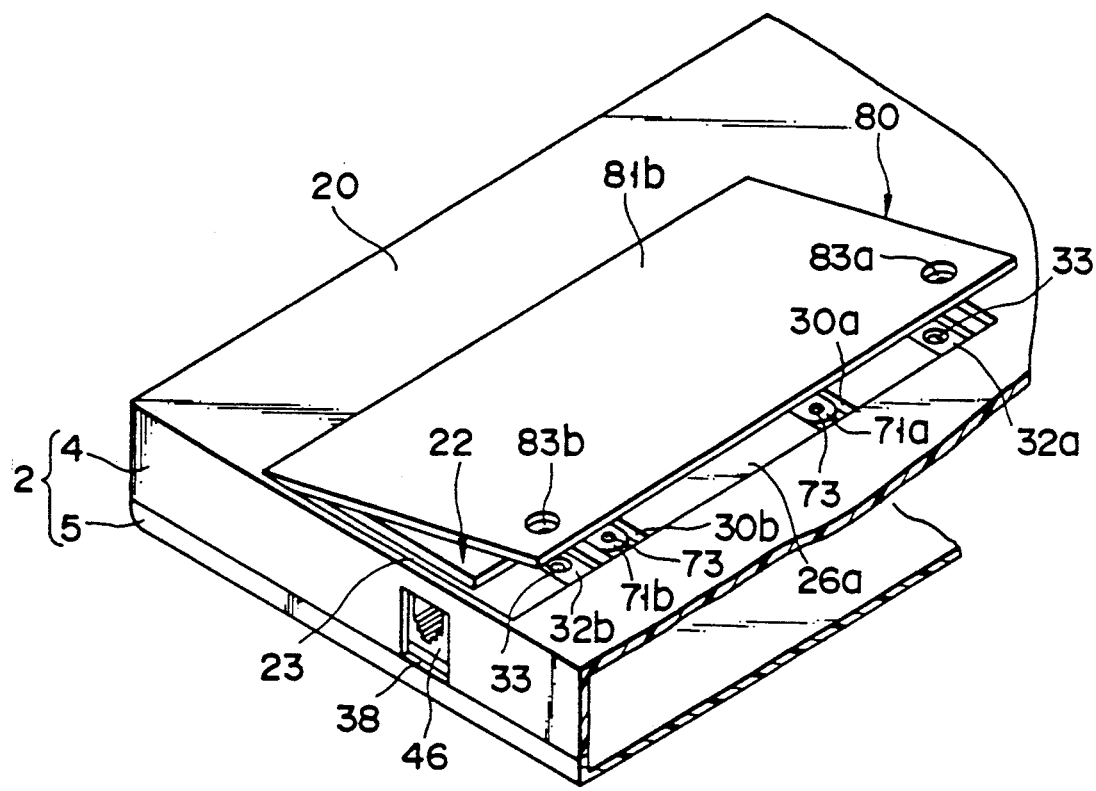
FIG. 7 is a perspective view showing a state in which the cover is being attached to the holding recess of the base unit.

A cover 80 for closing the opening 23 of the holding recess 21 is detachably mounted on the base unit 2. The cover 80 has a rectangular configuration corresponding to the size of the opening 23. The marginal edge portion of the cover 80 is supported on the engaging surface 26a formed on the inside of the opening 23. In the mounted state, the cover 80 has a back surface 81a exposed in the holding recess 21 and a surface 81b flush with the bottom surface 20 of the bottom case 4. As shown in FIG. 2, a pair of engaging projections 82a, 82b detachable relative to the engaging holes 29a, 29b of the holding recess 21, as well as a pair of seat portions 83a, 83b fitted in the second fixing sections 32a, 32b, are projected integral with the back surface 81a of the cover 80. The seat portions 83a, 83b have through holes 84 aligned with the screw holes 33, respectively. As shown in FIG. 7, the cover 80 is attached to the opening 23 with the engaging projections 82a, 82b directed downward. In the attached state, the engaging projections 82a, 82b are hooked at the engaging holes 29a, 29b and the seat portions 83a, 83b are placed on the second fixing sections 32a, 32b. By threadably inserting the screws 85 via the through holes 84 into the screw holes 33 in that state, the cover 80 is fixed to the base unit 2 so that the cover 80 is mounted flush with the bottom surface 20 of the base unit 2.

Figure 3:
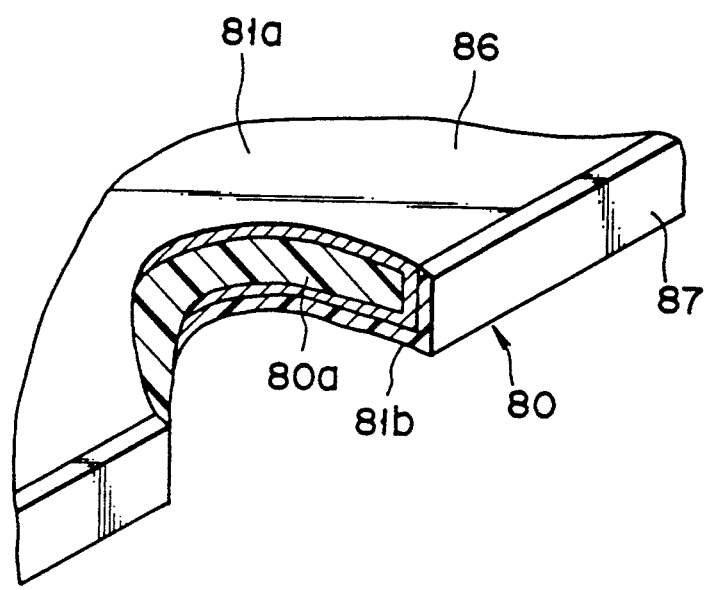
FIG. 3 is an enlarged, perspective view showing an area III in FIG. 2.

As shown in FIGS. 3 and 11, the cover 80 has a case 80a made of an electrically insulating material, such as a synthetic resin material. The case 80a of the cover 80, together with the engaging projections 82a, 82b and seat portions 83a, 83b, is covered with a conductive plating layer 86. The plating layer 86 is covered with a nonconductive decorative layer 87 except a portion corresponding to the back surface 81a of the cover 80. The plating layer 86 of the cover 80 is exposed only at an area facing the inside of the holding recess 21. In the state in which the opening 23 of the holding recess 21 is closed by the cover 80, the plating layer 86 covering the seat portions 83a, 83b electroconductively and firmly contacts with the plating layer 6 covering the second fixing sections 32a, 32b. The MODEM 22 is surrounded with the plating layers 86 and 6. The plating layers 86 and 6 are maintained in a conductive state by the screws 85 whereby the cover 80 is secured.

The steps of attaching the MODEM 22 to the holding recess 21 of the base unit 2 will be explained below.

First, the printed circuit board 40 with circuit parts 43 incorporated therein is pushed to the inside of the engaging wall 51 of the base support 41. Then the marginal edge of the printed circuit board 40 is sandwiched with the hooks 54 of the engaging projections 53 and receiving members 52. By so doing, the board support 41 and printed circuit board 40 are made as one unit so that the printed circuit board 40 is made parallel with the base plate 50 of the board support 41. The second connector 44 is mounted on the base plate 50 at the connector holding section 55 and the connection terminal 48 for grounding is attached to the terminal holding section 60 so that the MODEM 22 is completed.

Figure 6:
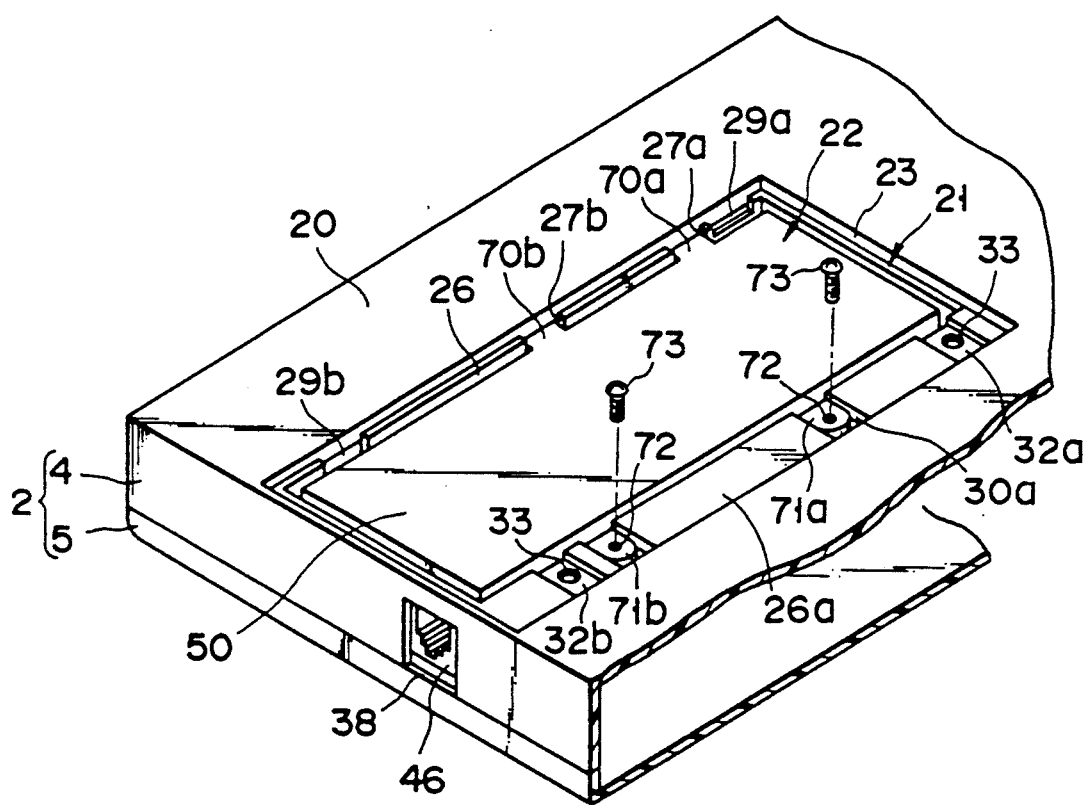
FIG. 6 is a perspective view showing a state in which the optional component unit is attached to a holding recess of the base unit.

Then the second connector 44 of the MODEM 22 is connected to the first connector 36 in the holding recess 21. After the connector 44 has been connected to the connector 36, the board support 41 of the MODEM 22 is inserted into the holding recess 21 with the board support 41 of the MODEM 22 gripped by hand and the printed circuit board 40 directed in its attitude toward the holding recess 21. By so doing, as shown in FIG. 6 the pair of engaging pieces 70a, 70b are fitted into the mating recesses 27a, 27b and the pair of fixing pieces 71a, 71b are fitted into the first fixing sections 30a, 30b. In this state, the fixing pieces 71a, 71b are tightly secured by the screws 73 to the first fixing sections 30a, 30b. By so doing, the MODEM 22 is secured in the holding recess 21, without slippage, with the circuit parts 43 and printed circuit board 40 directed in their attitude toward the bottom wall 25 of the holding recess 21. At the same time, the connection terminal 48 is made to contact with the plating layer 6 on the base unit 2 and hence to ground the MODEM 22.

Next, the opening 23 of the holding recess 21 is closed by the cover 80 and, as shown in FIG. 7, the cover 80 is inserted into the opening 23 with the engaging projections 82a, 82b down. The engaging projections 82a, 82b are hooked at the engaging holes 29a, 29b and the cover 80 is rotated with their hooked area as a fulcrum to place the seat portions 83a, 83b on the second fixing sections 32a, 32b. In this state, the seat portions 83a, 83b are tightly secured by the screws 85 to the second fixing sections 32a, 32b. By so doing, the cover 80 is fixed to the base unit 2 to cover the MODEM 22. In this state, the plating layer 86 on the seat portions 83a, 83b and the plating layer 6 on the securing sections 32a, 32b are electrically connected and the MODEM 22 is surrounded by the plating layers 6 and 86.

The portable computer 1 thus assembled has advantages as will be set out below.

The MODEM 22 mounted in the holding recess 21 is divided into the printed circuit board 40, having a printed circuit pattern 42, and board support 41. The printed circuit board 40 has the circuit parts 43 connected to the circuit pattern 42 and the board support 41 supports the printed circuit board 40. The board support 41, including the support structure of the printed circuit board 40, is made of an electrically insulating material, such as a synthetic resin material.

According to this arrangement, even if a portion of the circuit pattern 42 contacts the engaging wall 51 and hooks 54 of the board support 41 due to deviations of the pattern shape of the circuit pattern 42, the board support 41 and circuit pattern 42 are not short-circuited because the board support 41 including the engaging wall 51 and hooks 54 are all made of an electric insulating material. Since the board support 41 has the base plate 50 between the plating layer 86 of the cover 80 and the circuit pattern 42 of the printed circuit board 40, short-circuiting between the plating layer 86 and the circuit pattern 42 can be prevented by the base plate 50. The pattern of the circuit pattern 42, even if being somewhat deviated in shape, can prevent occurrence of a short-circuiting fault, ensuring a normal operation of the MODEM 22.

The cover 80 for covering the opening 23 of the holding recess 21 is covered with the plating layer 86. With the opening 23 closed by the cover 80, the plating layer 86 is placed in contact with the plating layer 6 on the holding recess 21 and, together with the plating layer 6, surrounds the MODEM 22. For this reason, the MODEM 22 is electromagnetically shielded, preventing noise from leaking out of the MODEM 22 in spite of the board support 41 made of the synthetic resin.

The mounting of the MODEM 22 to the base unit 2 can be achieved simply by inserting the MODEM 22 into the holding recess 21 and closing the opening 23 of the holding recess 21 by the cover 80. The insertion of the MODEM 22 is readily done without the need to disassemble the base unit 2. Since the MODEM 22 is held in the base unit 2, it is possible to prevent the portable computer 1 from being bulkier.

The present invention is not restricted to the aforementioned embodiment. Various changes and modifications of the present invention can be made without departing from the spirit and scope of the invention.

For example, the first connector provided in the holding recess may be mounted directly on the printed circuit board in the base unit without using the flexible circuit board.

Further, the electrical connection of the plating layer of the holding recess to that of the cover can be achieved in various ways without being restricted to the aforementioned embodiment.

The optional component for function expansion is not restricted to the MODEM set out above.

The present invention is not restricted only to a book- or a laptop-type portable computer and may be applied to the electric apparatus, such as a word processor.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

I claim:

1. A portable electronic apparatus comprising:
    a base unit having a peripheral surface, the base unit including a holding recess having interior walls, the interior walls being covered with a conductive layer for electromagnetic shielding;
    an optional component unit for function expansion being mounted in the holding recess, the optional component unit including a printed circuit board having a conductive circuit pattern and circuit parts electrically connected to the conductive circuit pattern;

a non-conductive board support mounted within the holding recess supporting the printed circuit board, the support comprising:
- a base wall portion covering the printed circuit board on a side of the circuit board adjacent an opening of the holding recess; and
- side walls continuous with the base wall disposed between the printed circuit board and the interior walls; and a conductive cover removably attached to the base unit and covering the opening so that the optional component unit is concealed within the holding recess, the cover being electrically connected to the conductive layer and, cooperating with the conductive layer, surrounding the optional component unit to provide a conductive shield.

2. The portable electronic apparatus according to claim 1, wherein the cover is comprised of an electrically insulting material and has a back surface facing the base wall of the board support unit, the back surface being covered with an another conductive layer for electromagnetic shielding and said conductive layer being electrically connected to the conductive layer of the holding recess.

3. The portable electronic apparatus according to claim 1, wherein, when the cover is attached to the base unit to close the opening, the cover provides a surface constituting a portion of the peripheral surface of the base unit, the surface being continuous with, and flush with, the peripheral surface of the base unit.

4. The portable electronic apparatus according to claim 1, wherein the interior walls of the holding recess have an engaging area on which the cover is placed, the engaging area being continuously covered with the conductive layer.

5. The portable electronic apparatus according to claim 1, wherein the holding recess has a first connector and the optional component unit has a second connector electrically connected to the first connector.

6. The portable electronic apparatus according to claim 5, wherein the second connector is provided at the printed circuit board and the side wall of the board support has a connector hole at an area corresponding to the second connector and the first connector is connectable to the second connector via the connector hole.

7. The portable electronic apparatus according to claim 1, wherein the optional component unit has a ground terminal connected to the printed circuit board, and the ground terminal is fixed to the board support and electrically connected to the conductive layer when the board support is attached to the holding recess.

8. The portable electronic apparatus according to claim 1, wherein the optional component unit is comprised of a modulator/demodulator connectable to a telephone line.

9. The portable electronic apparatus according to claim 1, wherein the base unit has a front portion having a keyboard and a rear portion having a display unit, and the display unit is so provided on the base unit that it can be rotated between a closed position where the keyboard is covered and an open position where the keyboard is exposed for use.

10. The portable electronic apparatus according to claim 1, wherein the base wall of the board support is disposed between the cover and the printed circuit board and the side walls of the board support surround a marginal edge portion of a printed circuit board.

11. The portable electronic apparatus according to claim 10, wherein the side walls have receiving members for receiving the marginal edge portion of the printed circuit board and hooks for hooking on the marginal edge portion of the printed circuit board and, together with the receiving members, holding the marginal edge portion of the printed circuit board in a sandwiching fashion.

12. The portable electronic apparatus according to claim 1, wherein the board support and base unit have holding means for holding the optional component unit in the holding recess, the holding means having first engaging means provided on the board support, second engaging means provided on the holding recess and capable of engaging with the first engaging means, and fixing means for maintaining the first and second engaging means and in an engaged relation.

13. The portable electronic apparatus according to claim 12, wherein the first engaging means have fixing pieces projected from the side walls of the board support, the second engaging means have fixing sections in which the fixing pieces are fitted and the fixing means has screws threadably inserted via the fixing sections into the second fixing sections.

14. A portable electronic apparatus comprising:
- a base unit having a bottom surface, the bottom surface having a holding recess having interior walls the interior walls having a receiving area extending parallel with the bottom surface of the base unit, the interior walls and the receiving area being covered with a first conductive layer;
- an optional component unit for function expansion which is mounted in the holding recess, the optional component unit including a printed circuit board having a marginal edge portion, a conductive circuit pattern on the circuit board and circuit parts electrically connected to the circuit pattern;
- a board support mounted in the holding recess supporting the printed circuit board and including a base wall having a size corresponding to that of the printed circuit board, the base wall covering a side of the printed circuit board, the board support having side walls continuous with the base wall being disposed between the marginal edge portion of the printed circuit board and the interior walls, the base wall and side walls being made of an electrically insulating material;
- a cover removably attached to the base unit and covering the holding recess, the cover being flush with the bottom surface and having an engaging portion engaging the receiving area, a surface of the cover facing the holding recess being covered with a second conductive layer for electromagnetic shielding, the second conductive layer, together with the first conductive layer, surrounding the optional component unit to achieve an electromagnetic shield; and
- fixing means for fixing the cover to the base unit, the fixing means pressing the cover against the engaging area to place the first conductive layer in close contact with the second conductive layer so that an electrical connection is maintained.

15. The portable electronic apparatus according to claim 14, wherein the first and second conductive layers are each comprised of a plating layer.

16. A portable electronic apparatus comprising:
a base unit including a peripheral surface, the base unit having a holding recess having interior walls being covered with a conductive layer for electromagnetic shielding;
an optional component unit for function expansion which is mounted in the holding recess, the optional component unit including a printed circuit board having a marginal edge portion, the printed circuit board including a conductive circuit pattern and circuit parts electrically connected to the circuit pattern;
a conductive cover removably attached to the base unit and covering the holding recess to conceal the optional component unit, the cover being electrically connected to the conductive layer and together with the conductive layer, surrounding the optional component unit so that an electromagnetic shield is achieved; and
a support member holding the optional component unit in the holding recess and made of electrically insulting material, the support member including a base plate having a size corresponding to that of the printed circuit board, the base plate being disposed between the printed circuit board and the cover, and a flange continuous with the base plate, the flange surrounding the marginal edge portion of the printed circuit, the flange having an engaging portion engaging the marginal edge portion of the printed circuit board to hold the printed circuit board in the support member, the support member being mounted in the holding recess.

17. A portable electronic apparatus comprising:
a base unit having a peripheral surface, the base unit including a holding recess in the peripheral surface, the holding recess having interior walls covered with a conductive layer for electromagnetic shielding;
a non-conductive board support mounted in the holding recess;
a component unit for functional expansion mounted to the board support within the holding recess, the component unit including a printed circuit board having a peripheral edge, the printed circuit board including a conductive circuit pattern and circuit parts electrically connected to the conductive circuit pattern, the board support forming a non-conductive barrier between the peripheral edge of the circuit board and the conductive layer of the holding recess; and
a conductive cover removably attached to the base unit and covering the holding recess so that the optional component unit is concealed within the holding recess, the cover being electrically connected to the conductive layer of the holding recess, forming with the conductive layer a conductive shield around the component.

18. The portable electronic apparatus according to claim 17, wherein the board support comprises:
a base wall having a size corresponding to that of the printed circuit board, the base wall covering the printed circuit board on a side of an opening of the holding recess; and
side walls continuous with the base wall and situated between the printed circuit board and the interior walls.

19. A portable electronic apparatus comprising:
a base unit having a peripheral surface, the base unit including a holding recess in the peripheral surface, the holding recess having interior walls covered with a conductive layer for electromagnetic shielding;
a non-conductive board support mounted in the holding recess;
a component unit for functional expansion mounted to the board support within the holding recess, the component unit including a printed circuit board having a peripheral edge, the printed circuit board including a conductive circuit pattern and circuit parts electrically connected to the conductive circuit pattern, the board support forming a non-conductive barrier, the barrier having an engaging portion for engaging the peripheral edge of the printed circuit board and the engaging portion being disposed so as to prevent electrical contact between the peripheral edge of the printed circuit board and the conductive layer of the holding recess; and
a conductive cover removably attached to the base unit and covering the holding recess so that the optional component unit is concealed within the holding recess, the cover being electrically connected to the conductive layer of the holding recess, forming with the conductive layer a conductive shield around the component.

* * * * *